(12) United States Patent
Spencer

(10) Patent No.: US 9,851,014 B2
(45) Date of Patent: Dec. 26, 2017

(54) APPARATUS FOR SETTING AND VERIFYING SET POINT ON A VALVE ASSEMBLY

(71) Applicant: Dresser, Inc., Addison, TX (US)

(72) Inventor: Mychal Phillip Spencer, Pineville, LA (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 15/361,693

(22) Filed: Nov. 28, 2016

(65) Prior Publication Data
US 2017/0102082 A1 Apr. 13, 2017

Related U.S. Application Data

(63) Continuation of application No. 14/055,458, filed on Oct. 16, 2013, now Pat. No. 9,528,630.

(51) Int. Cl.
F16K 51/00 (2006.01)
F16K 17/06 (2006.01)

(52) U.S. Cl.
CPC .................... *F16K 17/06* (2013.01)

(58) Field of Classification Search
CPC ....... F16K 17/06; F16K 37/0083; G01L 1/00; G01L 1/04
USPC ..... 137/315.04, 524, 530; 73/1.72; 267/175, 267/177
See application file for complete search history.

(56) References Cited

U.S. PATENT DOCUMENTS

| 1,822,587 | A | | 9/1931 | Essen |
| 2,080,760 | A | | 5/1937 | Condon |
| 2,419,293 | A | | 4/1947 | Simonson |
| 2,589,552 | A | | 3/1952 | Kerr |
| 2,616,292 | A | | 11/1952 | Malm |
| 3,019,811 | A | | 2/1962 | Young et al. |
| 3,269,170 | A | | 8/1966 | Sebring et al. |
| 4,086,809 | A | | 5/1978 | Wu et al. |
| 4,349,885 | A | * | 9/1982 | Thompson ............ G01L 5/0061 137/487.5 |
| 4,428,223 | A | | 1/1984 | Trevisan |
| 4,557,136 | A | | 12/1985 | Greenhaif |
| 4,641,521 | A | | 2/1987 | Lawrence |
| 4,761,999 | A | | 8/1988 | Thompson |

(Continued)

FOREIGN PATENT DOCUMENTS

CN 103195957 A 7/2013

OTHER PUBLICATIONS

International Search Report and Written Opinion issued in connection with related PCT Application No. PCT/US2014/055833 dated Nov. 25, 2014.

(Continued)

*Primary Examiner* — Reinaldo Sanchez-Medina
(74) *Attorney, Agent, or Firm* — Paul Frank + Collins P.C.

(57) ABSTRACT

Embodiments of an apparatus that provide functions to set and to verify the set point of a valve assembly in a single device. These embodiments forgo the need to use of two separate devices, one each to accomplish the tasks to set the set point and to verify the set point. Rather, the apparatus incorporates components that can assume different configurations including a first configuration that facilitates the task for setting the set point and a second configuration that facilitates the task of verifying the set point.

19 Claims, 12 Drawing Sheets

(56) References Cited

U.S. PATENT DOCUMENTS

| | | | | |
|---|---|---|---|---|
| 4,799,506 | A | * | 1/1989 | Taylor ............... F16K 17/06 137/469 |
| 4,840,057 | A | * | 6/1989 | Bingham ........... F16K 37/0091 137/315.27 |
| 5,275,036 | A | | 1/1994 | Schulz et al. |
| 6,019,126 | A | * | 2/2000 | Kelada ............... F16K 37/0091 137/493.8 |
| 6,098,446 | A | | 8/2000 | Buxton |
| 6,516,828 | B2 | * | 2/2003 | Choate ............... F16K 17/04 137/469 |
| 7,337,796 | B2 | * | 3/2008 | Choate ............... F16K 17/04 137/15.19 |
| 8,413,955 | B1 | * | 4/2013 | Rooney .............. F16K 1/422 251/171 |

OTHER PUBLICATIONS

First Office Action and search issued in connection with corresponding CN Application No. 201480057027.2 dated May 15, 2017.

\* cited by examiner ated, into a process line and/or on a pressurized vessel, to include steps to set the compressed state of the spring to match the set point for the application. Management of the application, as well as regulations and/or public policy, may also require periodic evaluation to assess, in situ, the operation of the valve assembly. For devices including pressure relief valves and safety valves, this assessment finds particular benefit because under ordinary operating conditions, these types of valves typically remain in the closed position and rarely, if ever, move from the closed position to the open position. The lack of movement may cause the set point to migrate away from the original settings (e.g., the compressed state of the spring) that the valve assembly had during installation. The evaluation procedures can ensure that the value for the set point of the valve assembly remains at a certain value or within a certain range.

APPARATUS FOR SETTING AND VERIFYING SET POINT ON A VALVE ASSEMBLY

CROSS-REFERENCE TO RELATED APPLICATIONS

This application is a continuation of U.S. patent Ser. No. 14/055,458, filed on Oct. 16, 2013, and entitled "APPARATUS FOR SETTING AND VERIFYING SET POINT ON A VALVE ASSEMBLY," the content of which is incorporated herein by reference in its entirety.

BACKGROUND

The subject matter disclosed herein relates to valves and valve technology with particular discussion about an apparatus that can aid in both setting and verifying a set point on a valve assembly.

Valve assemblies integrate several components that cooperate together to regulate flow of a working fluid. Pressure relief valves and other safety valves, for example, use a spring (and/or like resilient member) in a compressed state to maintain the valve assembly in a closed position. This spring exerts a spring force to locate a disc element in contact with a nozzle element to prevent flow of the working fluid through the device. In operation, the spring force correlates with a operating pressure for the working fluid that acts against the disc element. This operating pressure is also called the set point. When the pressure of the working fluid reaches (and/or surpasses) the set point, the disc element may move relative to the nozzle element to an open position that allows the working fluid to flow through the device.

Values for the set point often depend on factors specific to the application that incorporates the valve assembly. It is not uncommon for installation of the valve assembly, e.g., into a process line and/or on a pressurized vessel, to include steps to set the compressed state of the spring to match the set point for the application. Management of the application, as well as regulations and/or public policy, may also require periodic evaluation to assess, in situ, the operation of the valve assembly. For devices including pressure relief valves and safety valves, this assessment finds particular benefit because under ordinary operating conditions, these types of valves typically remain in the closed position and rarely, if ever, move from the closed position to the open position. The lack of movement may cause the set point to migrate away from the original settings (e.g., the compressed state of the spring) that the valve assembly had during installation. The evaluation procedures can ensure that the value for the set point of the valve assembly remains at a certain value or within a certain range.

Conventional devices are known that address the set point on valve assemblies. These devices can apply a load to the spring member, for example, in a direction that corresponds to movement of the disc element relative to the nozzle element to change the valve assembly from the closed condition to the open condition. Unfortunately, these conventional devices are generally only useful to either set or test the set point, but not both. For pressure relief valves that utilize large springs and/or springs that generate high spring forces, this shortcoming in the conventional devices requires use, storage, and maintenance of several different large, unwieldy devices on site to accomplish the tasks necessary to set and to verify the set point for these types of valve assemblies.

BRIEF SUMMARY OF THE INVENTION

This disclosure describes embodiments of an apparatus that provide the functions to set and to verify the set point of a valve assembly in a single device. These embodiments forgo the need to use of two separate devices, one each to accomplish the tasks to set the set point and to verify the set point. Rather, the apparatus incorporates components that can assume different configurations including a first configuration that facilitates the task for setting the set point and a second configuration that facilitates the task of verifying the set point.

BRIEF DESCRIPTION OF THE DRAWINGS

Reference is now made briefly to the accompanying figures, in which.

Where applicable like reference characters designate identical or corresponding components and units throughout the several views, which are not to scale unless otherwise indicated.

DETAILED DISCUSSION

The discussion below describes embodiments of an apparatus for use to set and to verify operating settings on a valve assembly. These operating settings include, for example, set point for pressure relief valves (also "safety valves") that relieve pressure build-up that might occur in a process line and/or a pressurized vessel. As discussed more below, the embodiments simplify the process that technicians perform to ensure proper operation of the valve assembly because the embodiments combine multiple functions (i.e., to set the set point and to verify the set point) into a single device. In conventional techniques, on the other hand, technicians utilize different devices to complete the requisite setting and/or verification procedure on the valve assembly. These techniques become particularly cumbersome because valve assemblies may require these types of devices to be of substantial size in order to generate forces in excess of 20,000 lbf or more to compress springs to set and to verify the appropriate set point. The embodiments of this disclosure simplify these tasks, while also eliminating the need to maintain and store separate devices for addressing the set point on the valve assembly.

Figure 1:
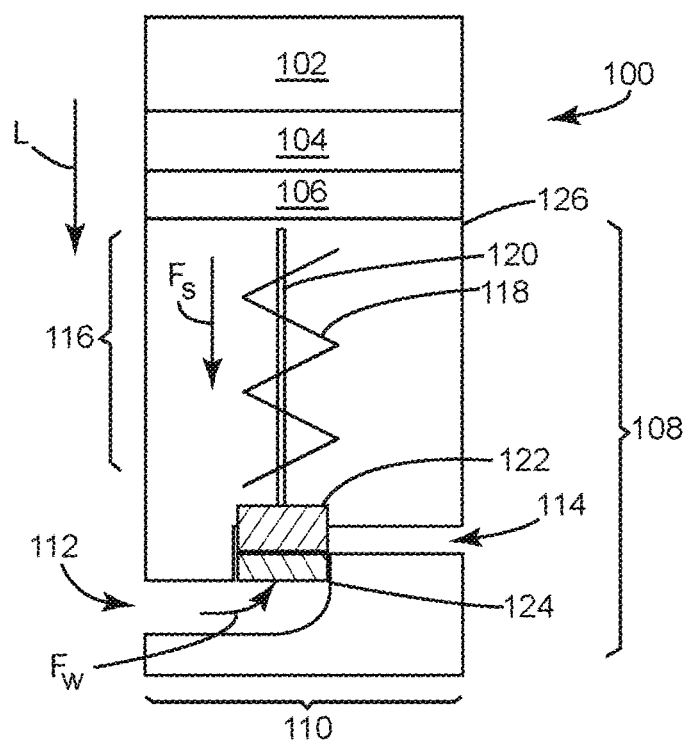
FIG. 1 depicts a schematic diagram of an exemplary embodiment of an apparatus to set and to verify set point on a valve assembly.

FIG. 1 depicts a schematic diagram of an exemplary embodiment of an apparatus 100 that incorporates components to both set and to verify the set point of a valve assembly. These components include a mounting component 102, a force generating component 104 that generates a load L, and a force coupling component 106. FIG. 1 also shows the apparatus 100 in position on a valve assembly 108. Examples of the valve assembly 108 can include pressure relief valves that regulate the flow of a working fluid $F_W$. The valve assembly 108 has a flow path 110 with one or more inlet/outlets (e.g., a first inlet/outlet 112 and a second inlet/outlet 114). The valve assembly 108 also has a number of valve components that regulate the flow of the working fluid $F_W$ between the inlet/outlets 112, 114. The valve components can include a spring assembly 116 with a spring member 118, a spindle member 120 that couples with a disc member 122, a nozzle member 124, and a bonnet member 126.

In conventional designs, the valve components operate to regulate the flow of the working fluid $F_W$ between the inlet/outlets 112, 114. For example, the spring member 118 may be configured as partially-compressed between the disc member 122 and the top of the bonnet 126. This configuration of the spring member 118 can generate a spring force $F_S$ on the disc member 122 that is effective to bias the disc member 122 downwardly to position the disc member 122 in contact with the nozzle member 124. The downward position "closes" the valve assembly 108 to prevent the flow of the working fluid $F_W$ through the nozzle member 124, e.g., from the first inlet/outlet 112 to the second inlet/outlet 114. A build-up of pressure of the working fluid $F_W$ against the disc member 122 in excess of the spring force $F_S$, however, can cause the disc member 122 to move upwardly (or "unseat") and away from the nozzle member 124. The change in position of the disc member 122 relative to the nozzle member 124 "opens" the valve assembly 108 to allow the flow of the working fluid $F_W$ through the nozzle member 124, e.g., from the from the first inlet/outlet 112 to the second inlet/outlet 114. The "set point" of the valve assembly 108 corresponds to the pressure that the working fluid $F_W$ must exert on the disc member 122 to overcome the spring force $F_S$ and move the disc member 122 relative to the nozzle member 124.

The apparatus 100 is configured to attach to the valve assembly 108 to direct the load L to compress the spring member 118 in various directions. This feature is useful to set or modify the set point and to verify the set point in situ on the valve assembly 108. As noted above, the apparatus 100 is unique because conventional devices and/or techniques can perform functions either to set the set point or to verify the set point, but not both. In a first implementation, the apparatus 100 can be used to "set" the set point of the valve assembly 108 by directing the load L so that the apparatus 100 pushes downwardly on a first end of the spring member 118 proximate the force coupling component 106. This action effectively causes the first end to deflect downwardly away from the top part of the bonnet 126. The first end also moves relative to the spindle member 120, which remains stationary because the opposite, second end of the spring member 118 pushes the disc member 122 down against the nozzle member 124. The valve assembly 108 may include components to secure the first end of the spring member 118 to maintain the deflection. This "deflected position" corresponds with the set point that is desired for operation of the valve assembly 108 on the process line. In a second implementation, the apparatus 100 can be used to "verify" the set point on the valve assembly 108 by directing the load L so that the apparatus 100 effectively causes the spindle member 120 to move upwardly in the valve assembly 108. This action also pulls the disc member 122 upwardly, causing the spring member 118 to compress in a second direction against the secured first end, as might occur under appropriate pressure from the working fluid $F_W$ that will displace the disc member 122 away from the nozzle member 124. By measuring the load L required to cause the spring member 118 to deflect in the second direction, this second implementation is useful to verify that the spring member 118 has the appropriate initial compression (as set as the deflected position by the first implementation above) and, thus, that the valve assembly 108 will operate on the process line at the desired set point to "open" in response to appropriate pressure of the working fluid $F_W$ on the disc member 122.

As discussed more below, the force coupling component 106 can change among multiple configurations to adapt the apparatus 100 to appropriately direct the load L to accommodate both the first implementation and the second implementation above. The force coupling component 106 can assume a first configuration that directs the load L from the force generating component 104 to compress the spring member 118 in the first direction. The first configuration is useful to set the set point of the valve assembly 108. The force coupling component 106 can also assume a second configuration, which is different from the first configuration, to direct the load L from the force generating component 104 in a manner to compress the spring member 118 in the second direction (and opposite of the first direction). The second configuration is useful to verify the set point of the valve assembly 108.

Figure 2:
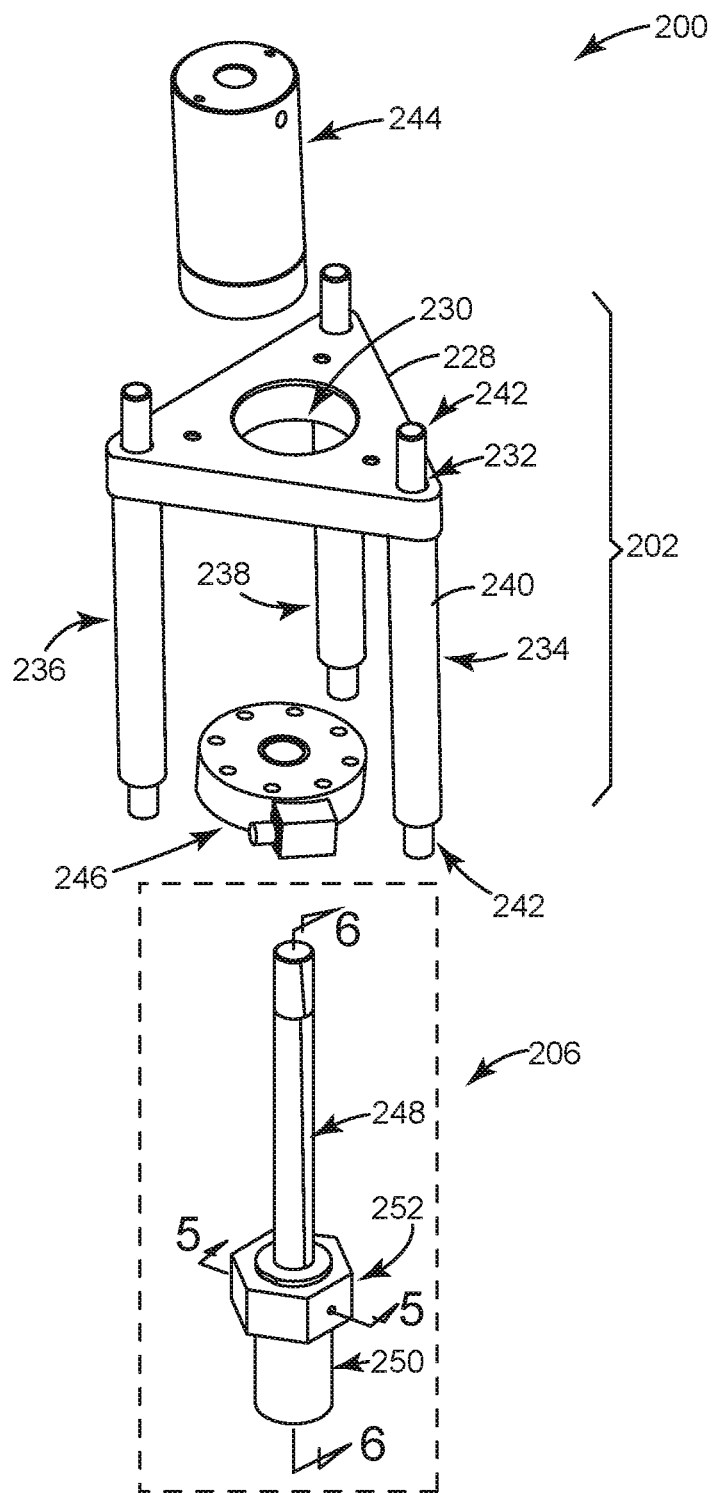
FIG. 2 depicts a perspective view of an exemplary embodiment of an apparatus for setting and verify set point on a valve assembly.

FIG. 2 illustrates a perspective view of an exemplary embodiment of an apparatus 200 in partial exploded form. The components of the apparatus 200 can be part of a kit, which when assembled will effectuate the functions of the apparatus 200. As noted herein, the embodiments of the apparatus 200 offers the dual functions to set and to verify the set point of a valve assembly, the combination of which is generally not found on conventional devices that separately perform these functions. In FIG. 2, the mounting component 202 has a mounting plate 228 with a central opening 230 and one or more peripheral openings 232. The mounting component 202 can also have one or more mounting legs (e.g., a first mounting leg 234, a second mounting leg 236, and a third mounting leg 238) forming an elongated body 240 with ends 242 that can incorporate threads to couple with a fastener (e.g., a nut) and/or correspondingly threaded opening or hole. The force generating component (e.g., force generating component 104 of FIG. 1) includes a lift member 244 and a load measuring member 246. Examples of the lift member 244 can leverage a piston-and-cylinder arrangement typical of pneumatic or hydraulic actuators. The force coupling component 206 includes a spindle connection member 248, a plunger connection member 250, and a force directing member 252.

Figure 3:
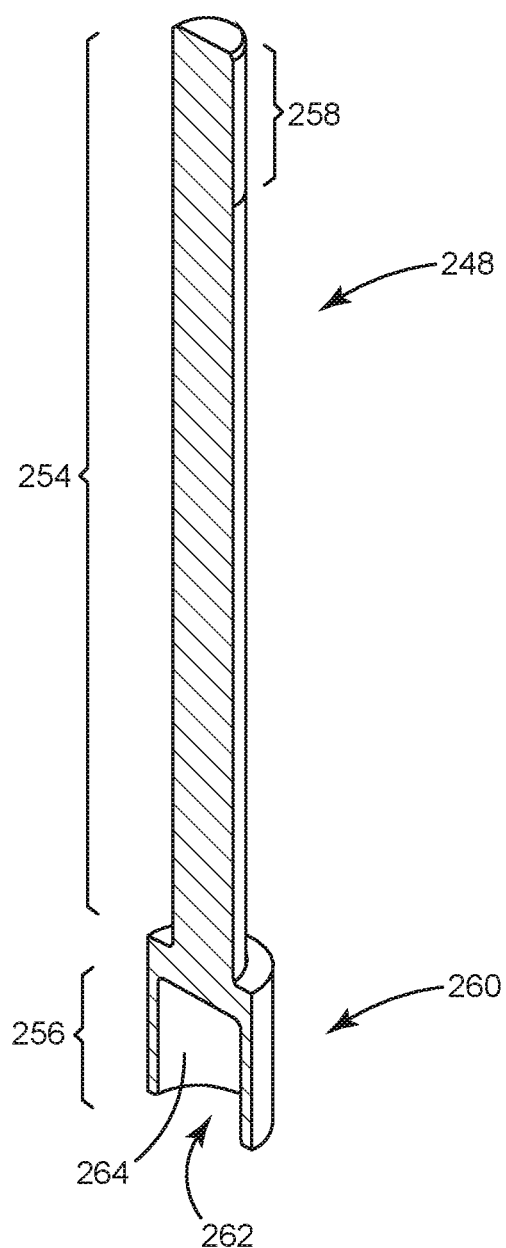
FIG. 3 depicts a perspective, cross-section view of an example of a spindle connection member for use in the apparatus of FIGS. 1 and 2.
Figure 4:
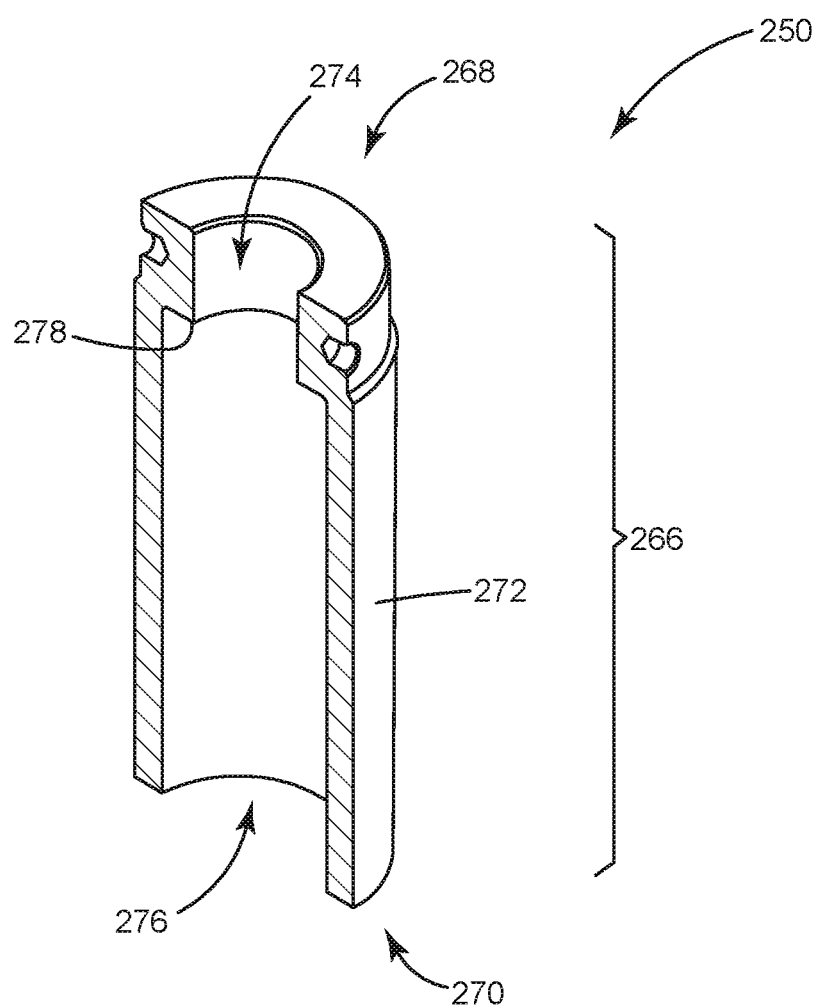
FIG. 4 depicts a perspective, cross-section view of an example of a plunger connection member for use in the apparatus of FIGS. 1 and 2.
Figure 5:
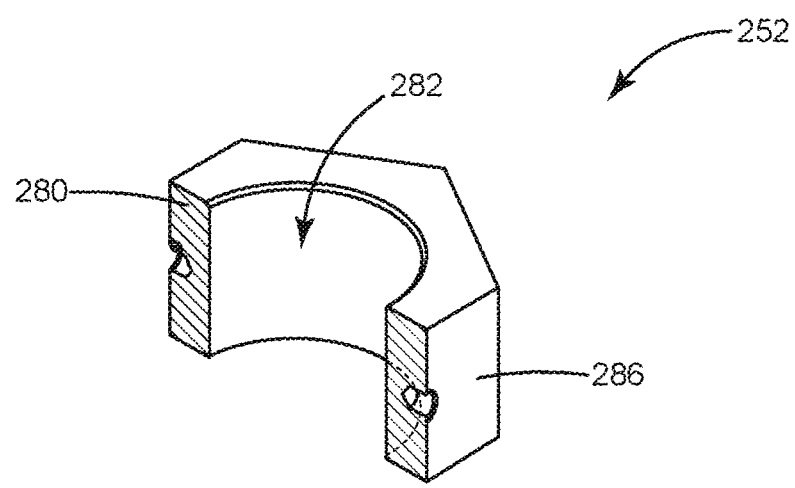
FIG. 5 depicts a perspective, cross-section view of an example of a force directing member for use in the apparatus of FIGS. 1 and 2.

FIGS. 3, 4, and 5 provide details of the construction of the components 248, 250, 252 of the force coupling component 206. FIG. 3 illustrates a cross-section of an example of the spindle connection member 248. FIGS. 4 and 5 depict a cross-section of an example of, respectively, the plunger connection member 250 and the force directing member 252.

Broadly, manufacture of the components 248, 250, 252 (and the apparatus 200 generally) can utilize materials and techniques that comport with the application and/or valve assembly the apparatus 200 will affix thereon. Material selection will often exhibit properties that can withstand the rigors of operation (e.g., high pressures and loads) and environment (e.g., caustic, corrosive, high temperature, etc.). Suitable metals (e.g., steel, stainless steel, etc.) and/or composites are some likely candidate materials for use in one or more of the components 248, 250, 252.

The spindle connection member 248 of FIG. 3 has a shaft 254 with a first end 256 and a second end 258. The first end 256 of the shaft 254 has an attachment element 260 with an attachment bore 262. In one example, the attachment bore 262 has an interior bore surface 264 that incorporates threads that match with corresponding threads on a spindle member (e.g., spindle member 118 of FIG. 1). At the second end 258, the shaft 254 terminates at a prepared section that can have features (e.g., threads) to couple with a fastener (e.g., a bolt).

In FIG. 4, the example of the plunger connection member 250 has a body 266 with a top 268, a bottom 270, and an outer peripheral surface 272. The body 266 also has a first bore 274 and a second bore 276 extending from the bottom 270. In one example, the diameter of the first bore 274 is smaller than the diameter of the second bore 276, thus creating a shelf 278 (also "mating surface 278") in the interior of the body 266. The outer peripheral surface 272 can incorporate threads and/or like surface features that prepare the surface to engage one or more other components, e.g., the force directing member 252.

The force directing member 252 of FIG. 5 has a body 280 with a central bore 282. The body 280 also has an outer profile that defines the features of an outer surface 286. These features can include one or more planar surfaces, an example of which is shown in FIG. 5. The planar surfaces can also facilitate manipulation of the force directing member 252. For example, and as discussed in more detail below, the planar surfaces can provide leverage for a tool (e.g., a wrench) to grab onto the force directing member 252 to change the position of the force directing member 252 relative to the plunger connection member 250.

Figure 6:
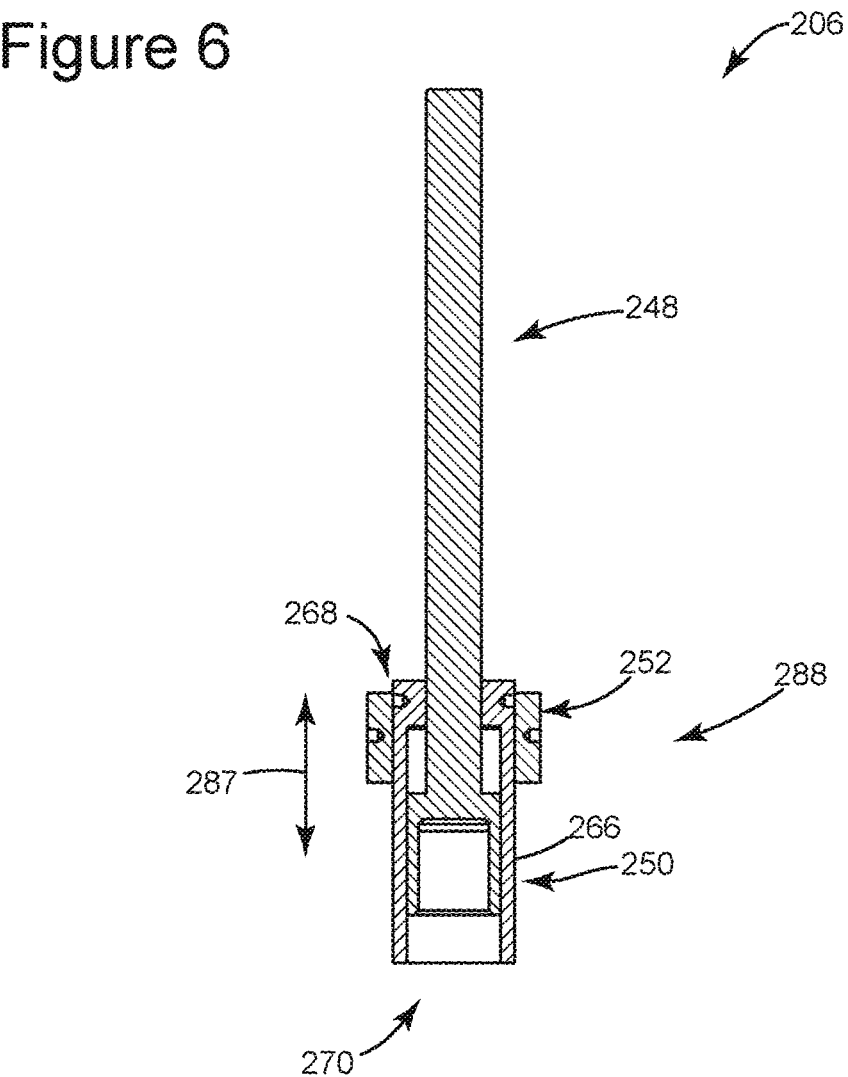
FIG. 6 depicts a perspective, cross-section view of a force coupling component that includes the spindle connection member, the plunger connection member, and the force directing member of FIGS. 3, 4, and 5, wherein the force directing member is in a first position relative to the plunger connection member.
Figure 7:
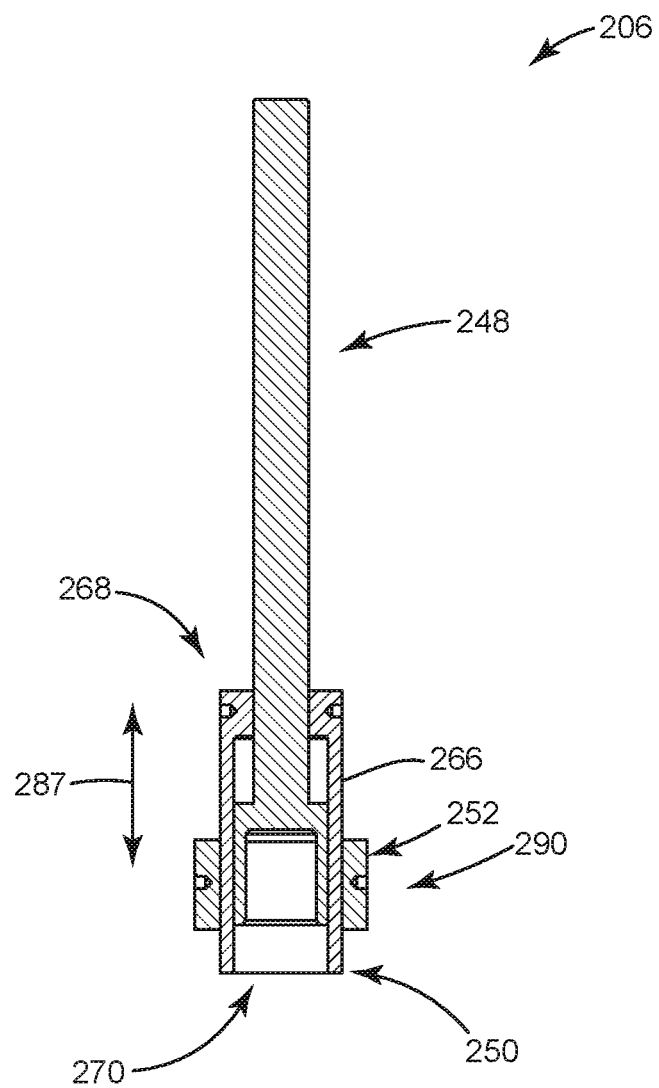
FIG. 7 depicts the force coupling component of FIG. 6, wherein the force directing member is in a second position relative to the plunger connection member.

FIGS. 6 and 7 illustrate cross-section views of the force coupling component 206 take at line 6-6 of FIG. 2. As noted above, and indicated in FIGS. 6 and 7 by the arrow enumerated 287, the force-directing member 252 can transit longitudinally relative to the plunger connection member 250. This movement changes the position of the force force-directing member 252 with respect to the top 268 and the bottom 270 of the body 266 of the plunger connection member 250. In FIG. 6, for example, the force-directing member 252 is shown in a first position 288 proximate the top 268. The example of FIG. 7 shows the force-directing member 252 in a second position 290, which is different from the first position and spaced apart from the top 268.

Figure 8:
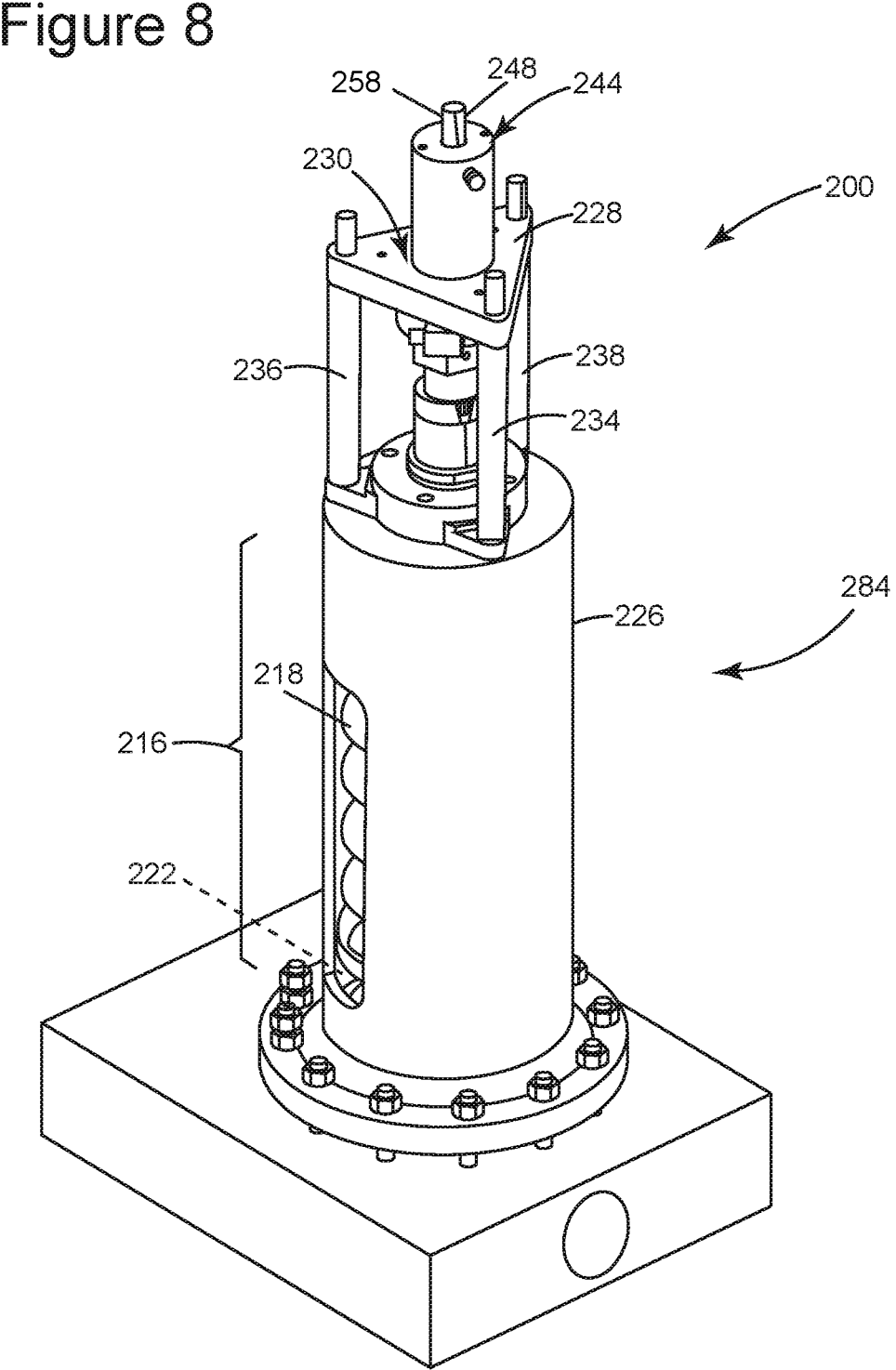
FIG. 8 depicts the apparatus of FIG. 2 in position on a pressure relief valve.

FIG. 8 illustrates one implementation of the apparatus 200 to set and to verify the set point on a valve assembly, shown here as a pressure relief valve 284. This implementation couples one end of the mounting legs 234, 236, 238 with corresponding openings (e.g., threaded openings) at the top of the bonnet member 226. This arrangement locates the apparatus 200 in position to interface with the spring assembly 216, which itself includes the spring member 218 and the disc member 222. The bonnet 226 can enclose these components, in whole or in part. In one implementation, the lift member 244 inserts into the opening 230 on the mounting plate 228, coupling to the mounting plate 228 to allow joint movement of both pieces as noted more below. The lift member 244 may be configured with mounting hardware (e.g., fasteners, brackets, etc.) or with complimentary threads that match threads on the interior of the opening 230 for this purpose. The spindle connection member 248 extends through the lift member 244, exposing the end 258 outside of the lift member 244. The other end of the spindle connection member 248 can couple with the spindle member (not shown) on the spring assembly 216.

Figure 9:
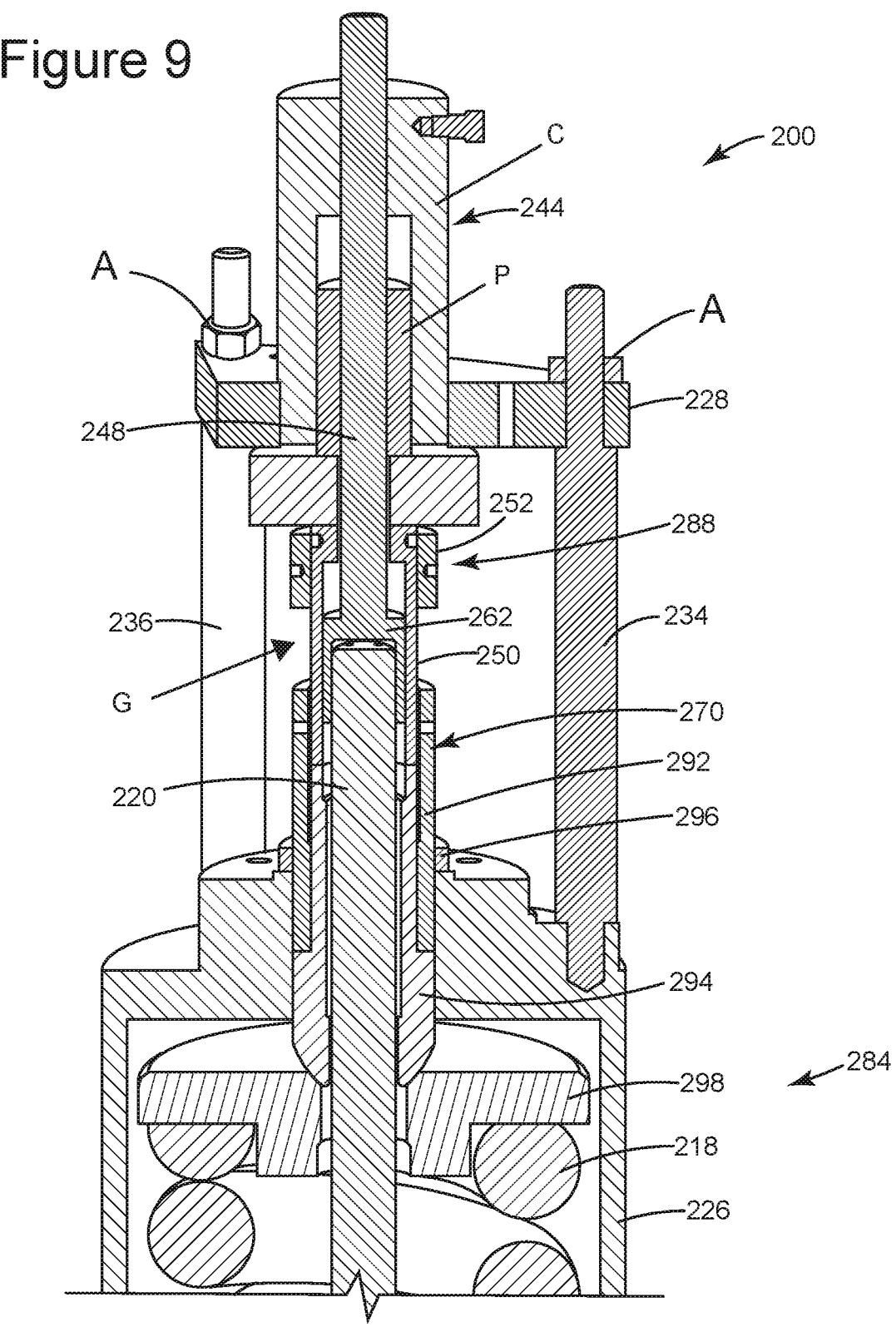
FIG. 9 depicts an elevation, cross-section view of the apparatus of FIG. 8, wherein the apparatus is in a first configuration to set the set point of the pressure relief valve.
Figure 10:
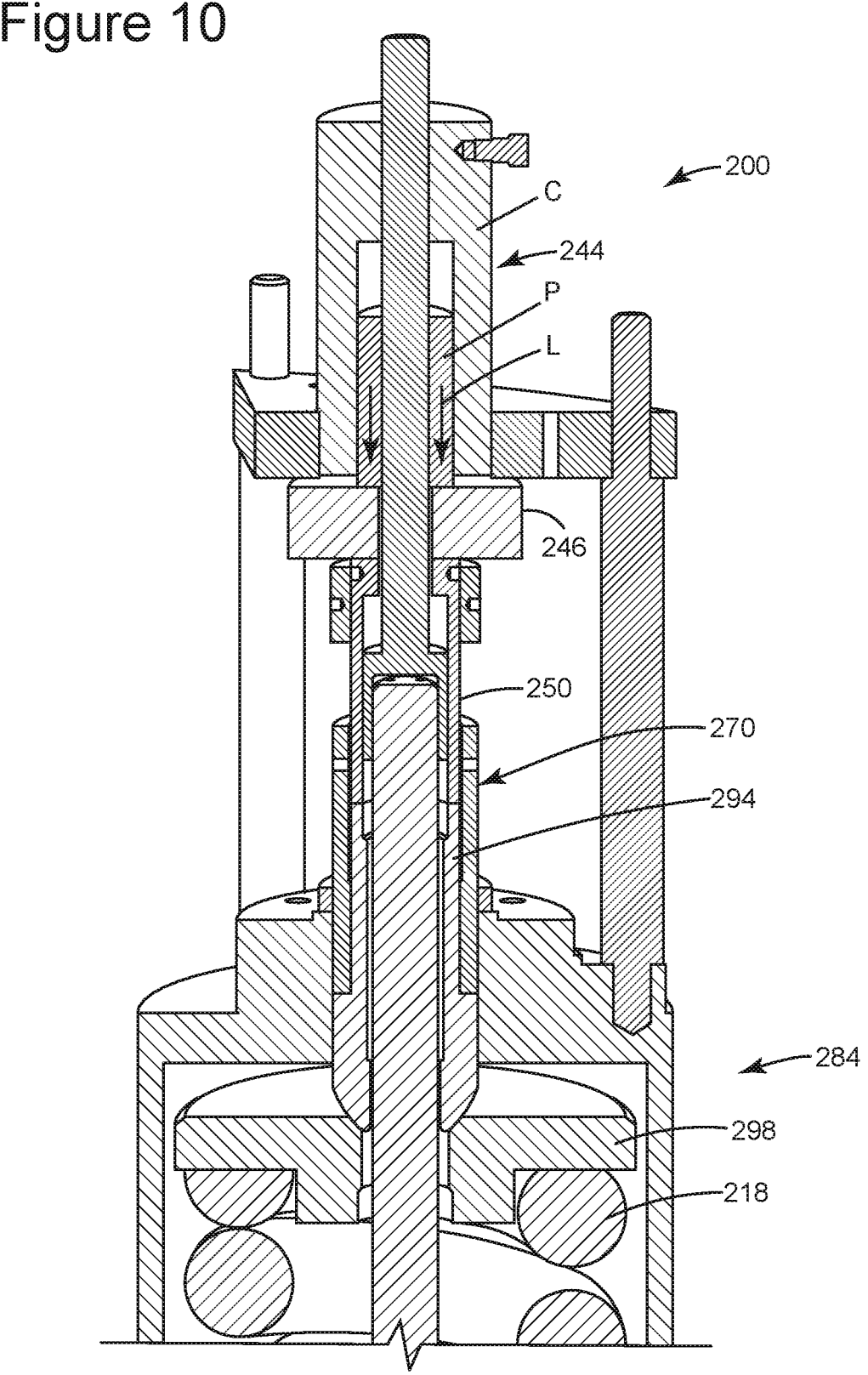
FIG. 10 depicts the loading pattern of the apparatus of FIG. 9.
Figure 11:
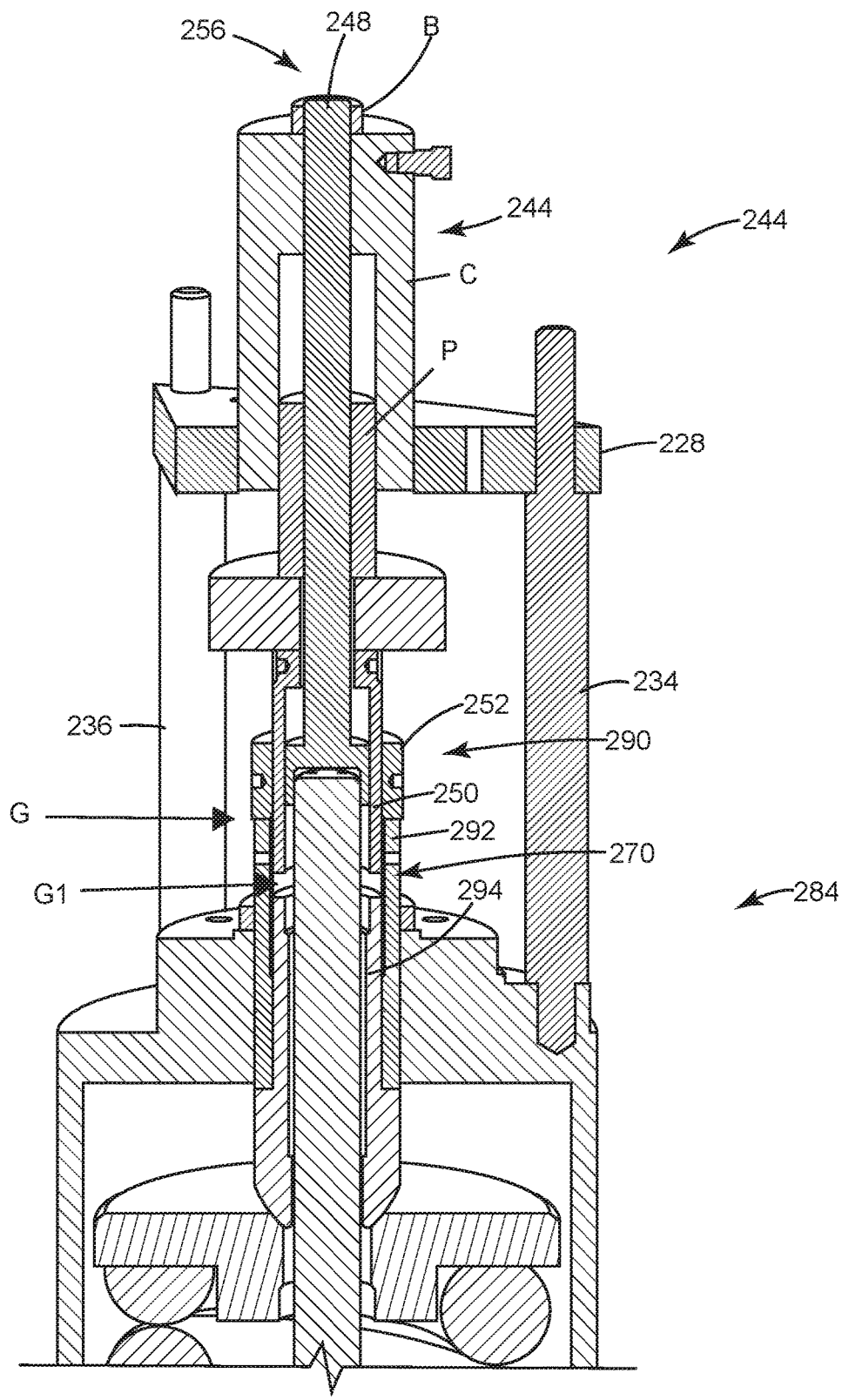
FIG. 11 depicts an elevation, cross-section view of the apparatus of FIG. 8, wherein the apparatus is in a second configuration to verify the set point of the pressure relief valve.
Figure 12:
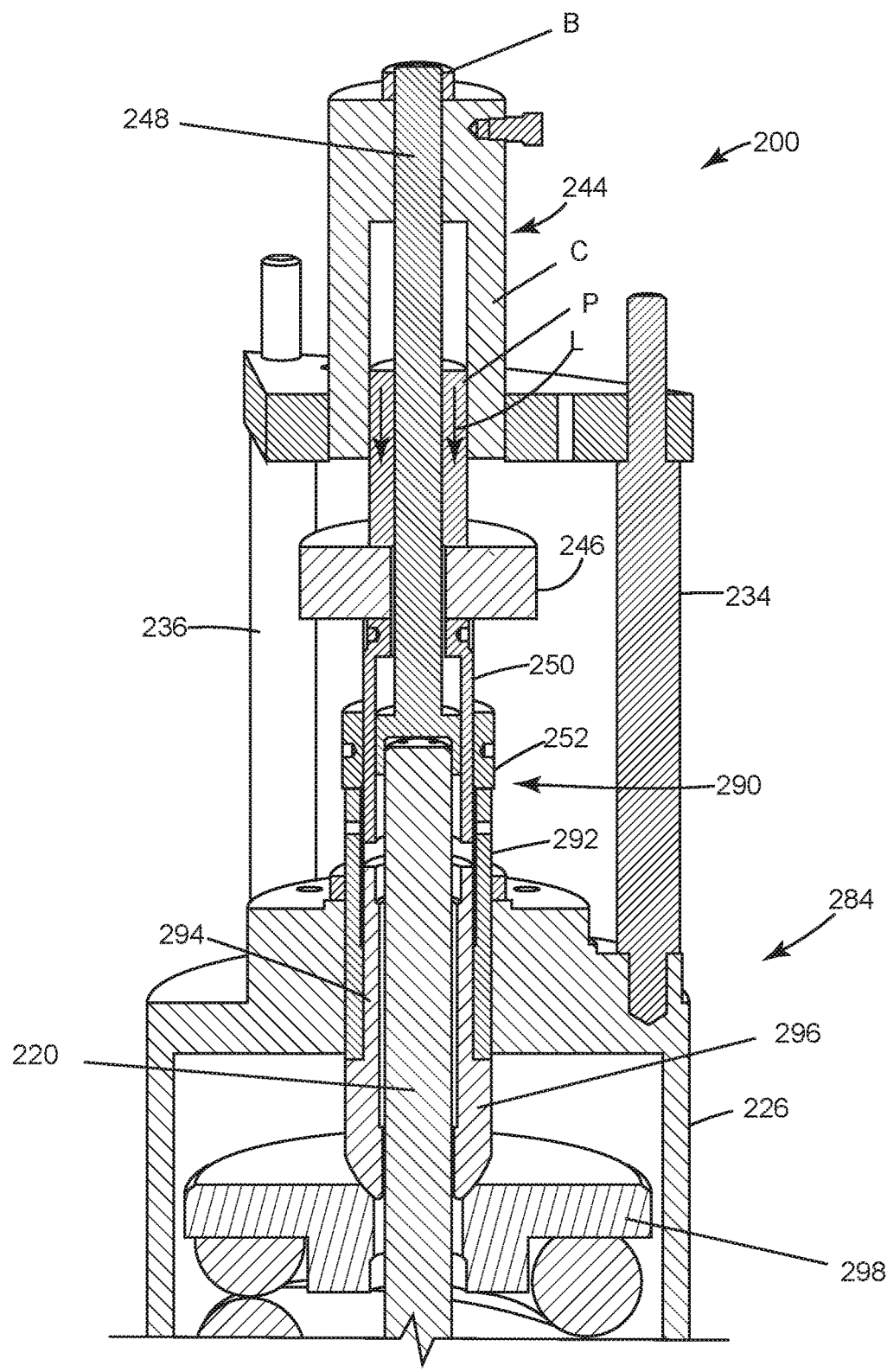
FIG. 12 depicts the loading pattern of the apparatus of FIG. 11.

FIGS. 9, 10, 11, and 12 illustrate a front, cross-section view of the pressure relief valve 284 taken at line 9-9 of FIG. 8. This view, and the discussion that follows, provide additional details on the construction and possible use of the apparatus 200 to set and to verify set point in situ on the pressure relief valve 284. FIGS. 9 and 10 show the apparatus 200 in a first configuration that is useful to set the set point of the pressure relief valve 284. FIGS. 11 and 12 show the apparatus 200 in a second configuration, which is different from the first configuration. The second configuration is useful to verify the set point of the pressure relief valve 284. As noted herein, conventional techniques would require more than one device to perform these two functions (i.e., to set and to verify the set point) on the pressure relief valve 284.

As shown in FIG. 9, the pressure relief valve 284 includes a compression screw 292, a plunger 294, a lock nut 296, and spring washer 298. The loading member 244 can include a piston P that is moveable in the cylinder C, typically to extend and retract from one end of the cylinder C. In conventional operation, force on the plunger 294 is used to press down on the spring washer 298 to cause deformation of the spring member 218 to the deflected position that corresponds with the desired set point for the device. The compression screw 292 threads into the bonnet member 226 to contact the plunger 294, which sets the position of the plunger 294 and maintains the deflection in the spring member 218. The lock nut 296 engages threads on the outer surface of the compression screw 292 and can be tightened against the bonnet 226 to further lock the compression screw 292 in position. This feature fixes the deformation in the spring member 218 at the deflected position by preventing the compression screw 292 (and the plunger 294) from backing out of position in the bonnet member 226.

The first configuration of the apparatus 200 sets the deformation of the spring member 218 to its deflected position prior to "locking" the compression screw 292 in position with the lock nut 296. This deflected position may correspond with the set point of the pressure relief valve 284. In one implementation, fasteners A secure in position on leg members 234, 236, 238 to fix the mounting plate 228 in position against a shoulder portion of the leg members 234, 236, 238 and prevent relative movement between the mounting plate 228 and the bonnet member 226. The attachment element 262 of the spindle connection member 248 secures to the top of the spindle member 220. As also shown in FIG. 9, the plunger connection member 250 interposes between the outer surface of spindle connection member 248 and the inner surface of the compression screw 292. At the bottom 270, the plunger connection member 250 contacts the top of the plunger 294. The force directing member 252 assumes the first position 288, creating a gap G that spaces the bottom of the force directing member 252 apart from the top of the compression screw 292.

FIG. 10 illustrates the loading pattern that the first configuration of the apparatus 200 creates to deform the spring member 218. The fasteners A are missing from the diagram but would normally be in position on the mounting legs 234, 236, 238 as shown on FIG. 9 and noted herein. During operation, actuation of the lift member 244 causes the piston P to extend downwardly from the cylinder C to generate the load L onto the load measuring member 246, which transfers the load L to the top of the plunger connection member 250. In one example, the load measuring member 246 rests on the plunger connection member 250. Contact between the bottom 270 of the plunger connection member 250 and the top of the plunger 294 transfers the load L to cause the plunger 294 to press against the spring washer 298. The resulting loading on the spring washer 298 compresses the spring member 218 downwardly (in the first direction) so that the first end of the spring member 218 moves down and away from the top part of the bonnet 226.

The load measurement member 246 provides a read out of the spring force that result from compression of the spring member 218. To set the set point of the pressure relief valve 284, one implementation of the apparatus 200 increases the load L until the spring force reaches a value calculated according to Equation (1) below:

$$F = P_{Set}\left(\frac{\pi}{4}\right)d_{Seat}^2,\qquad \text{Equation (1)}$$

where F is the spring force, $P_{Set}$ is the set pressure (the "set point") of the pressure relief valve, and $d_{Seat}$ is the diameter of the seat on the nozzle member (e.g., nozzle member 124 of FIG. 1). With reference also to FIG. 9, once the spring force F reaches the desired level, the compression screw 292 and the lock nut 296 can move (e.g., by hand or tool) to a position that engages the compression screw 292 against the plunger member 294 and the lock nut 296 against the bonnet member 226. This position of the compression screw 292 and the lock nut 296 locks the position of the compression screw 292, thus maintaining the deflected position in the spring member 218 that results from the loading pattern discussed above. Once the deflected position is locked, the piston P is free to retract into the cylinder C as necessary to complete set-up of the pressure relief valve 284.

FIGS. 11 and 12 illustrate the second configuration of the apparatus 200 that is useful to verify the set point of the pressure relief valve 284. In one implementation, a fastener B secures to the end 256 of the spindle connection member 248. The fasteners A are removed from the mounting legs (e.g., mounting legs 234, 236, 238 as shown and discussed in connection with FIGS. 9 and 10). Without the fasteners A, the mounting plate 228 and the lift member 244 can move or "float" together relative to the mounting legs 234, 236, 238 and the bonnet member 226. The bottom 270 of the plunger connection member 250 is spaced apart from the plunger 294 forming a gap $G_1$. The force directing member 252 assumes the second position 290, which locates the force directing member 252 in contact with the top of the compression screw 292 and eliminates (or minimizes) the gap G.

FIG. 12 illustrates the loading pattern that the second configuration of the apparatus 200 creates to compress the spring member 218 in the second direction. During operation, the piston P of the lift member 244 extends from the cylinder C to generate the load L onto the load measuring member 246, which transfers the load L to the plunger connection member 250. In one example, the load measuring member 246 rests on the plunger connection member 250. However, unlike the first configuration, contact between the force directing member 252 (in the second position 290) and the compression screw 292 directs the load L to the bonnet member 226 (via threaded connection between the compression screw 292 and the bonnet member 226 and threaded connection between the plunger connection member 250 and the force directing member 252) and not to the plunger 294 or the first end of the spring member 218. This "fixed" structure causes the piston P to push against the bonnet member 226. In this way, extension of the piston P of the lift member 244 is realized by upward movement of the cylinder C and the mounting plate 228 off of the shoulder of the mounting legs 234, 236, 238. The "moving" cylinder C pushes against the fastener B and, in turn, the spindle connection member 248. The spindle connection member 248 pulls the spindle 220 and the disc member 222 upwardly. In use, when the load L increases above the spring force $F_S$ of the spring member 218, the second configuration causes the spring member 218 to compress in the second direction against, for example, the spring washer 298 which itself is fixed by the plunger 294 and the lock nut 296. In turn, the disc member 222 moves away from the nozzle member (e.g., nozzle member 124 of FIG. 1). This movement mimics operation of the pressure relief valve 284, for example, to open as might occur under appropriate pressure from the working fluid $F_W$ on the process line. The read out of the load measuring member 246 can be used to identify the spring force at which this movement occurs and, using Equation (1) above, equate the spring force $F_S$ to verify the set point of the pressure relief valve 254.

In light of the discussion above, embodiments of the apparatus 200 (and the apparatus 100) can function both to set and to verify the set point of the pressure relief valve 284 (and other valve assemblies). These capabilities are lacking in many, if not all, of the conventional devices that technicians can use to either set or verify set point, but not both.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
a force directing component configured to couple with a bonnet on a valve assembly, the force directing component having a first configuration and a second configuration that is different from the first configuration, each configuration operative so that, when in position on the bonnet, the force directing component is configured to transfer a load from a lift member to a spring member on the valve assembly,
wherein the first configuration configures the force directing component to transfer the load from the lift member to compress the spring member in a first direction, and
wherein the second configuration configures the force directing component to direct the load from the lift member to compress the spring member in a second direction that is the opposite of the first direction,
wherein the force directing component comprises a first member with a shaft that has a first end that is configured to couple with a spindle on the valve assembly and a second end that is configured to extend through the lift member.

2. The apparatus of claim 1, wherein the force directing component comprises a second member and a third member, wherein the second member has a top, a bottom, and a peripheral surface, and wherein the third member has a body that circumscribes the peripheral surface of the second member.

3. The apparatus of claim 2, wherein the peripheral surface of the second member and the central bore of the third member comprise threads that are configured to engage one another to allow the third member to transit relative to the second member.

4. The apparatus of claim 2, wherein the third member has a first position and a second position relative to the top of the second member, wherein the first position is different from the second position, and wherein the first configuration and the second configuration of the force directing component correspond to, respectively, the first position and the second position.

5. The apparatus of claim 1, further comprising:
a mounting component that couples with the lift member, wherein the mounting component is configured to position the lift member to receive part of the force coupling component therein.

6. The apparatus of claim 1, further comprising a load cell that circumscribes the force directing component.

7. The apparatus of claim 1, wherein the first direction is configured to move a disc element in contact with a nozzle element in the valve assembly.

8. The apparatus of claim 1, wherein the second direction is configured to cause the disc element to move away from the nozzle element in the valve assembly.

9. An apparatus, comprising:
a load member comprising a piston moveable in a cylinder;
a plate coupled with cylinder;
a spindle connection member extending through the cylinder and the piston, the spindle connection member having a first end and a second end that connects to a spindle on a valve assembly;
a plunger connection member receiving the second end of the spindle connection member and the spindle; and
a force-directing member coupled to the plunger connection member,
wherein the force-directing member is configured to rotate to change positions on the plunger connection member,
wherein the positions include a first position and a second position, one each to cause the piston to defect a spring on the valve assembly in opposite directions.

10. The apparatus of claim 9, further comprising:
mounting legs having a first end to receive the plate and a second end to engage a bonnet of the valve assembly,
wherein the plate is moveable relative to the mounting legs in only one of the first position and the second position.

11. The apparatus of claim 10, wherein the mounting legs have threads on the first end to receive fasteners to prevent movement of the plate.

12. The apparatus of claim 10, wherein the first end of the plunger connection member has threads to receive a fastener to allow the plate to move relative to the mounting legs.

13. The apparatus of claim 9, further comprising:
a load cell insertable onto the spindle connection member.

14. The apparatus of claim 9, wherein the plunger connection member is configured to insert into a compression screw on the valve assembly.

15. The apparatus of claim 14, wherein the plunger connection member and the force-directing member have complimentary threads.

16. A method, comprising:
adjusting a valve assembly comprising a spindle, a disc member attached to a first end of the spindle, a nozzle, a spring, and a bonnet enclosing the spindle, the disc member, the nozzle, and the spring, by:
securing an apparatus to the bonnet of the valve assembly, the apparatus comprising a load member with a piston movable in a cylinder; and
operating the load member while attached to the valve assembly to set and to verify deflection of the spring,
wherein the apparatus has a first configuration that allows the piston to extend toward the nozzle so as to cause the spring to deflect in a first direction with the disc member against the nozzle, and
wherein the apparatus has a second configuration that prevents the piston from extending toward the nozzle so as to cause the spring to deflect in a second direction to cause the disc member to move away from the nozzle.

17. The method of claim 16, further comprising:
fixing the spring in a deflected position set by the first direction.

18. The method of claim 16, further comprising:
fixing the cylinder in position relative to the bonnet in the first configuration.

19. The method of claim 16, further comprising:
floating the cylinder relative to the bonnet in the second configuration.

* * * * *